(12) United States Patent
Yoshida et al.

(10) Patent No.: US 7,996,911 B2
(45) Date of Patent: *Aug. 9, 2011

(54) MEMORY CARD

(75) Inventors: Satoshi Yoshida, Tachikawa (JP);
Kunihiro Katayama, Chigasaki (JP);
Akira Kanehira, Ikebukurohoncho (JP);
Masaharu Ukeda, Yokohama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 562 days.

This patent is subject to a terminal disclaimer.

(21) Appl. No.: 12/182,123

(22) Filed: Jul. 29, 2008

(65) Prior Publication Data

US 2008/0301817 A1 Dec. 4, 2008

Related U.S. Application Data

(63) Continuation of application No. 10/868,960, filed on Jun. 17, 2004, now Pat. No. 7,418,602.

(30) Foreign Application Priority Data

Jun. 20, 2003 (JP) ................................. 2003-175974

(51) Int. Cl.
G06F 7/04 (2006.01)
(52) U.S. Cl. .......................................... 726/26; 713/193
(58) Field of Classification Search .................... 726/26; 713/193

See application file for complete search history.

(56) References Cited

U.S. PATENT DOCUMENTS

| 5,210,795 | A | 5/1993 | Lipner et al. | |
|---|---|---|---|---|
| 5,636,096 | A | 6/1997 | Mardirossian | |
| 6,026,492 | A * | 2/2000 | Cromer et al. | 726/35 |
| 6,067,621 | A * | 5/2000 | Yu et al. | 713/172 |
| 6,199,167 | B1 * | 3/2001 | Heinrich et al. | 726/18 |
| 6,282,612 | B1 * | 8/2001 | Sakajiri et al. | 711/115 |
| 6,286,087 | B1 | 9/2001 | Ito et al. | |
| 6,498,748 | B2 | 12/2002 | Ikeda | |
| 7,159,120 | B2 | 1/2007 | Muratov et al. | |
| 2001/0056541 | A1 * | 12/2001 | Matsuzaki et al. | 713/193 |

FOREIGN PATENT DOCUMENTS

| JP | 64-500378 A | 2/1989 |
|---|---|---|
| JP | 05-274498 A | 10/1993 |
| JP | 10-79197 | 3/1998 |
| JP | 11-306093 A | 11/1999 |
| JP | 11-345494 | 12/1999 |
| WO | WO 87/07063 A1 | 11/1987 |

OTHER PUBLICATIONS

MultiMediaCard System Specification, Version 3.1, MMCA, Jun. 2001, pp. 32-34.

* cited by examiner

Primary Examiner — Kambiz Zand
Assistant Examiner — Amare F Tabor
(74) Attorney, Agent, or Firm — Miles & Stockbridge P.C.

(57) ABSTRACT

In order to protect the user security data, provided is a memory card capable of preventing the data leakage to a third party not having the access authority by imposing the limitation on the number of password authentications and automatically erasing the data. In a system comprised of a multimedia card and a host machine electrically connected to the multimedia card and controlling the operations of the multimedia card, a retry counter for storing the number of password authentication failures is provided and the upper limit of the number of failures is registered in a register. When passwords are repeatedly entered once, twice, . . . and n times and the retry counter which counts the entries reaches the upper limit of the number of failures, the data is automatically erased so as not to leave the data in the flash memory.

2 Claims, 17 Drawing Sheets

FIG. 3

| Byte# | Bit7 | Bit6 | Bit5 | Bit4 | Bit3 | Bit2 | Bit1 | Bit0 |
|---|---|---|---|---|---|---|---|---|
| 0 | | | | | ERASE | LOCK-UNLOCK | CLR-PWD | SET-PWD |
| 1 | PWD_LEN ||||||||
| 2 | Password data ||||||||
| ... | ||||||||
| PWD_LEN+1 | ||||||||
| N−3 | ||||||||
| N−2 | RETRY COUNTER ~51 ||||||||
| N−1 | ||||||||
| N | UPPER LIMIT ~52 ||||||||

MEMORY CARD

CROSS-REFERENCE TO RELATED APPLICATION

This application is a continuation of application Ser. No. 10/868,960 filed Jun. 17, 2004, now U.S. Pat. No. 7,418,602 which claims priority from Japanese Patent Application No. JP 2003-175974 filed Jun. 20, 2003, the content of which is hereby incorporated by reference into this application.

TECHNICAL FIELD OF THE INVENTION

The present invention relates to a memory card. More particularly, the present invention relates to a technique effectively applied to a memory card with a security function which has a non-volatile memory such as a flash memory (flash EEPROM) provided therein.

BACKGROUND OF THE INVENTION

According to the examination by the inventors of the present invention, the following techniques are known for the memory card.

For example, as the external storage devices of the personal computer and the mobile device, a memory card such as a multimedia card (registered trademark) standardized by the MMCA (MultiMediaCard Association), the standardization body, is widely known, and the multimedia card is used for the static image recording on a digital video camera, the data recording on a mobile phone, and the sound recording on a mobile audio player.

In the multimedia card mentioned above, various operations to a flash memory in the card such as data read, write, and erase are controlled by the various commands issued from such host machines as the personal computer and the mobile device. For example, the Lock_Unlock command standardized in pp. 32 to 34 of MultiMediaCard System Specification Version 3.1 by the MMCA (official release June 2001) can execute the password set/password clear/lock_unlock/erase, and the protection of the user data stored in the flash memory can be achieved by this command.

SUMMARY OF THE INVENTION

Incidentally, as a result of the examination of the multimedia card as mentioned above by the inventors of the present invention, the followings are found out.

For example, in the case of the above-mentioned Lock_Unlock command, even though the multimedia card locked by setting a password is used, the user data may be leaked to a third party other than the user, who sets the password, by the password-guessing attack.

More specifically, the Lock_Unlock command is provided for the purpose of restricting the access to the flash memory by using a password. However, the password may be discovered and leaked by repeatedly trying and entering passwords, and in the event that the password is discovered, the user data stored in the flash memory is read and leaked to a third party.

Also, a system having a limitation on the number of password authentications like the cash card system of a bank is present. However, the above-mentioned system is centrally controlled by the host system connected via a network, the data is written to the cash card, and the cash card itself cannot be removed forcibly before the data is written to the card. On the other hand, the memory card can be easily disconnected from the host machine and the memory card itself can be removed forcibly from the host machine.

Therefore, an object of the present invention is to provide a memory card capable of preventing the data leakage to a third party not having the access authority by imposing a limitation on the number of password authentications and automatically erasing the data in order to protect the user security data.

The above and other objects and novel characteristics of the present invention will be apparent from the description and the accompanying drawings of this specification.

The typical ones of the inventions disclosed in this application will be briefly described as follows.

In the present invention, when the number of incorrect password entries to a password-locked memory card exceeds a predetermined value, the secure information stored in the non-volatile memory area is automatically erased in order to protect the user security data.

Also, in the memory card according to the present invention, when the number of incorrect password entries exceeds a predetermined value, the controller which performs the password authentication issues an erase command of data to another controller and the security data in the non-volatile memory controlled by another controller is automatically erased.

Specifically, the memory card according to the present invention is applied to a memory card such as a multimedia card and has the following characteristics:

(1) When the number of password authentication failures (the number of incorrect password entries) exceeds an upper limit (a predetermined value), all data in the flash memory or the non-volatile memory is automatically erased so as not to leave the user data in the flash memory. Note that, it is also possible to set so as not to erase the control area including the secure area. The data for correcting a bad bit is included in the control area, and it becomes possible to reuse the memory card with the data in the control area being not erased.

(2) When the number of password authentication failures exceeds the upper limit, the read protect bit is set to make the data unreadable. In this case, the time for erasing all of the data in the flash memory or the non-volatile memory becomes unnecessary and the recovery of the data becomes possible. The data erase in this case is performed while setting the read protect bit enable. Note that it is also possible to make the data unwritable by the write protect bit.

(3) The area of the flash memory or the non-volatile memory in which data is automatically erased is optionally set by using a registered address of the erase target area or an identification code of the control area. Since it is possible to erase only the confidential data in this case, the versatility of the memory card can be expanded.

(4) The number of password authentication failures and the upper limit are stored in the flash memory or the non-volatile memory so that they are not lost even if the power supply is turned off. Therefore, if the data erase in the case where the number of failures exceeds the upper limit is interrupted due to the power-off, the number of password authentication failures and the upper limit are read and compared in the reset process after the power supply is turned on, and the data erase is performed again after the power supply is turned on.

BRIEF DESCRIPTIONS OF THE DRAWINGS

FIG. 3 is an explanatory diagram showing the bit allocation of the password block in the secure area according to an embodiment of the present invention;

DESCRIPTION OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof is omitted.

Figure 1:
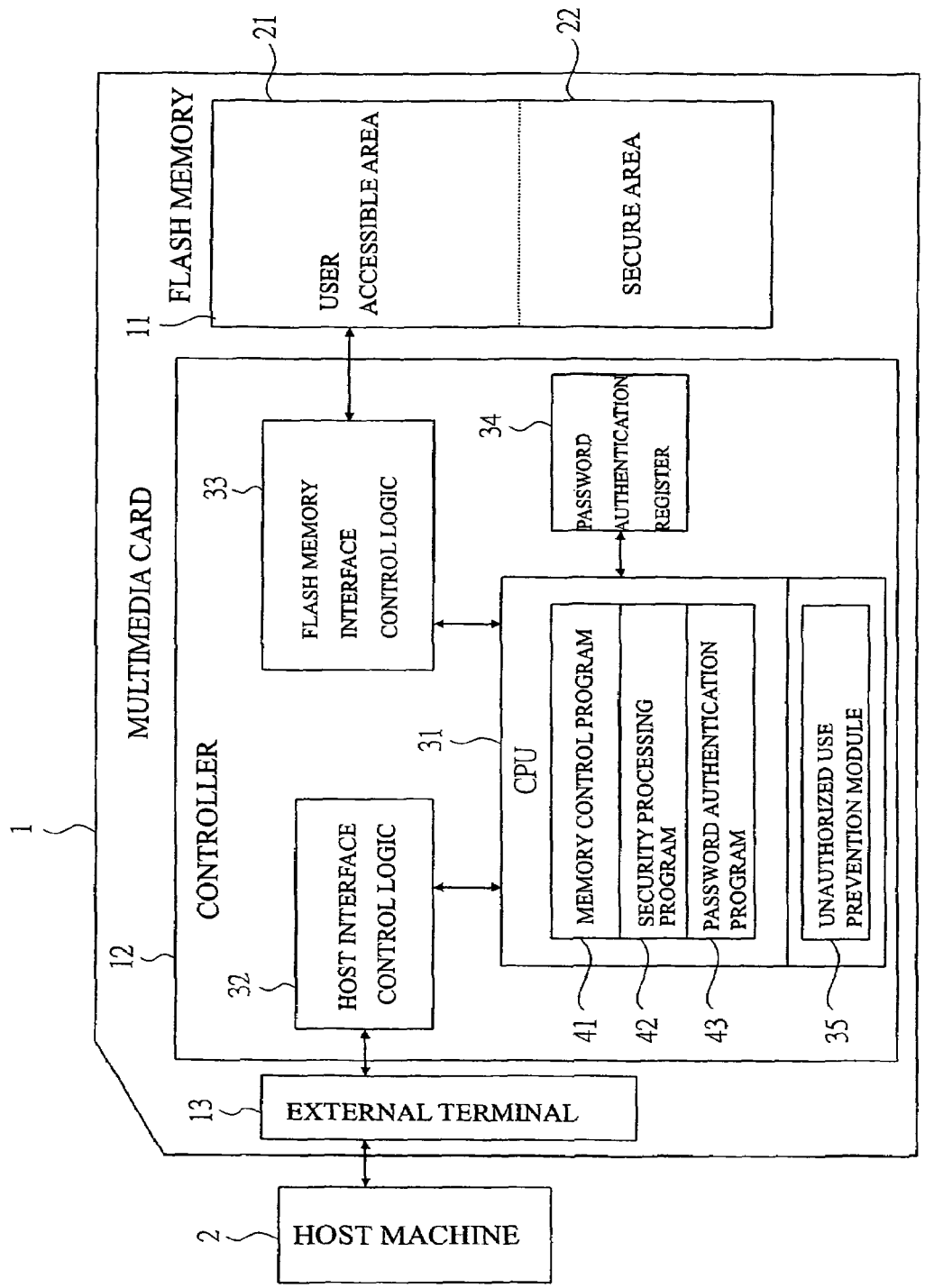
FIG. 1 is a block diagram showing a system using the memory card according to an embodiment of the present invention.

An example of a system configuration using the memory card according to an embodiment of the present invention will be described with reference to FIG. 1. FIG. 1 is a block diagram of a system using the memory card according to this embodiment.

The system according to this embodiment is the system using a multimedia card as an example of the memory card, and this system is comprised of a multimedia card 1 and a host machine 2 which is electrically connected to the multimedia card 1 and provides commands to the multimedia card 1 to control the operation of the multimedia card 1. In this system, the host machine 2 is, for example, a personal computer and a mobile device, and the multimedia card 1 is used as an external storage media thereof.

The multimedia card 1 is comprised of a flash memory 11 for storing various data, a controller 12 for controlling the operation of the flash memory 11, and the like. The multimedia card 1 is designed to be removably inserted into the host machine 2 and when the multimedia card 1 is in the state to be inserted into the host machine 2, it is electrically connected to the host machine 2 through an external terminal 13.

The flash memory 11 includes a user accessible area 21 for storing user data used by a user and a secure area 22 for storing secure information to control the flash memory 11. The secure area 22 stores the data concerning the security and the password authentication and the like. In addition, the data for correcting a bad bit of the flash memory 11 and a part of the program executed by the controller 12 can be stored in the secure area 22 or in the control area (not shown) other than the secure area 22.

The controller 12 is provided with a CPU 31 which controls overall processing in the card, a host interface control logic 32 which controls the interface with the host machine 2 and has a control logic function for the connection with the host machine 2, a flash memory interface control logic 33 which controls the interface with the flash memory 11 and has a control logic function to access the flash memory 11, and a password authentication register 34 for reading the data for the password authentication from the secure area 22 of the flash memory 11 and temporarily storing the data.

The CPU 31 stores therein a memory control program 41, a security processing program 42, and a password authentication program 43 and operates based on these programs. The memory control program 41 is a program for performing the access control in each of the operations to the flash memory 11 such as read, write, and erase. The security processing program 42 is a program for performing the process for security. The password authentication program 43 is a program for performing the user authentication process by using a password. In addition, the CPU 31 also includes an unauthorized use prevention module 35 which determines whether or not the access to the multimedia card 1 is authorized. This unauthorized use prevention module can be formed as a dedicated circuit or as a program executed by the CPU without forming any dedicated circuit.

In the system with the above-described configuration, various commands to control the operations are issued from the host machine 2 to the multimedia card 1, more specifically, the Lock_Unlock commands for performing "password set/password clear/lock_unlock/erase/are issued. When the commands as mentioned above are issued and the password authentication fails a predetermined times, the data is automatically erased to enhance the security. The erase in this case does not indicate the erase in the file level, that is, the erase bit is set enable as the file control data on the file allocation table, but indicates the physical erase, that is, the threshold voltage of the memory cell in the flash memory 11 which stores the data therein is set to the erase level so as to completely remove the data.

Next, in the system using the memory card according to this embodiment, an example of the operation in the case where the password lock command is issued will be sequentially described.

Figure 2:
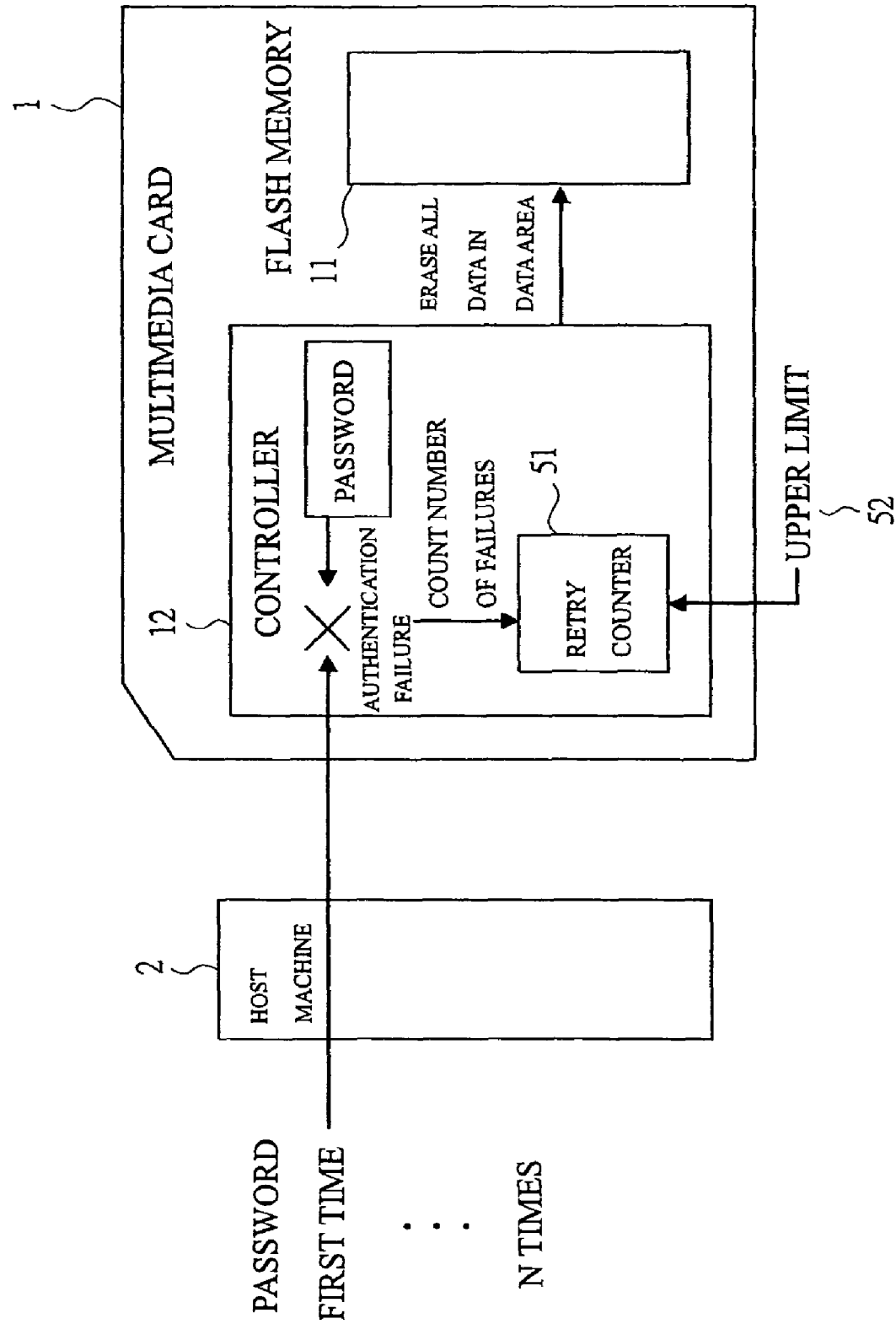
FIG. 2 is an explanatory diagram showing the password authentication in the case where a password lock command is issued according to an embodiment of the present invention.
Figure 4:
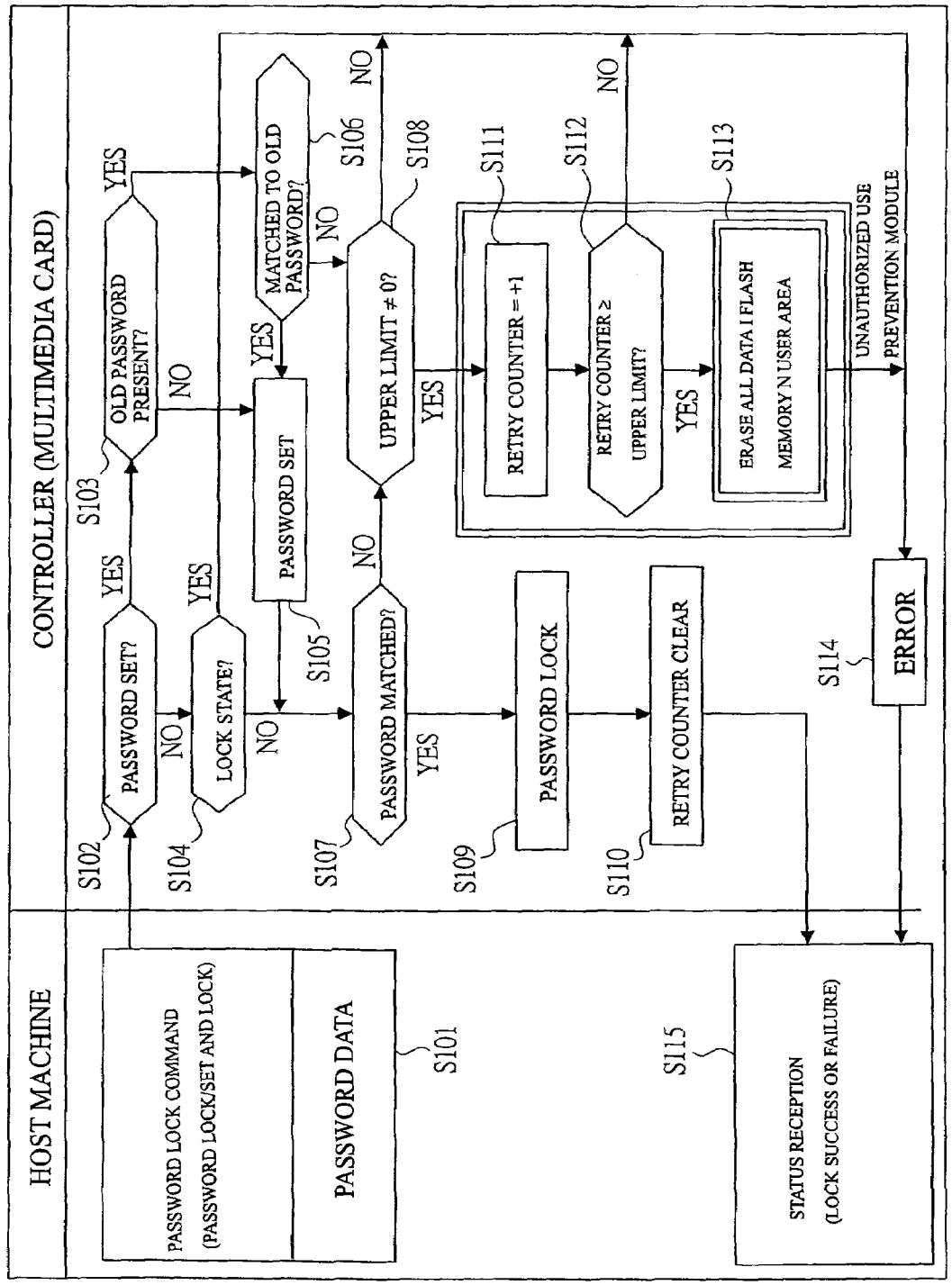
FIG. 4 is a flow diagram showing the operation in the case where a password lock command (password set/lock) is issued according to an embodiment of the present invention.
Figure 5:
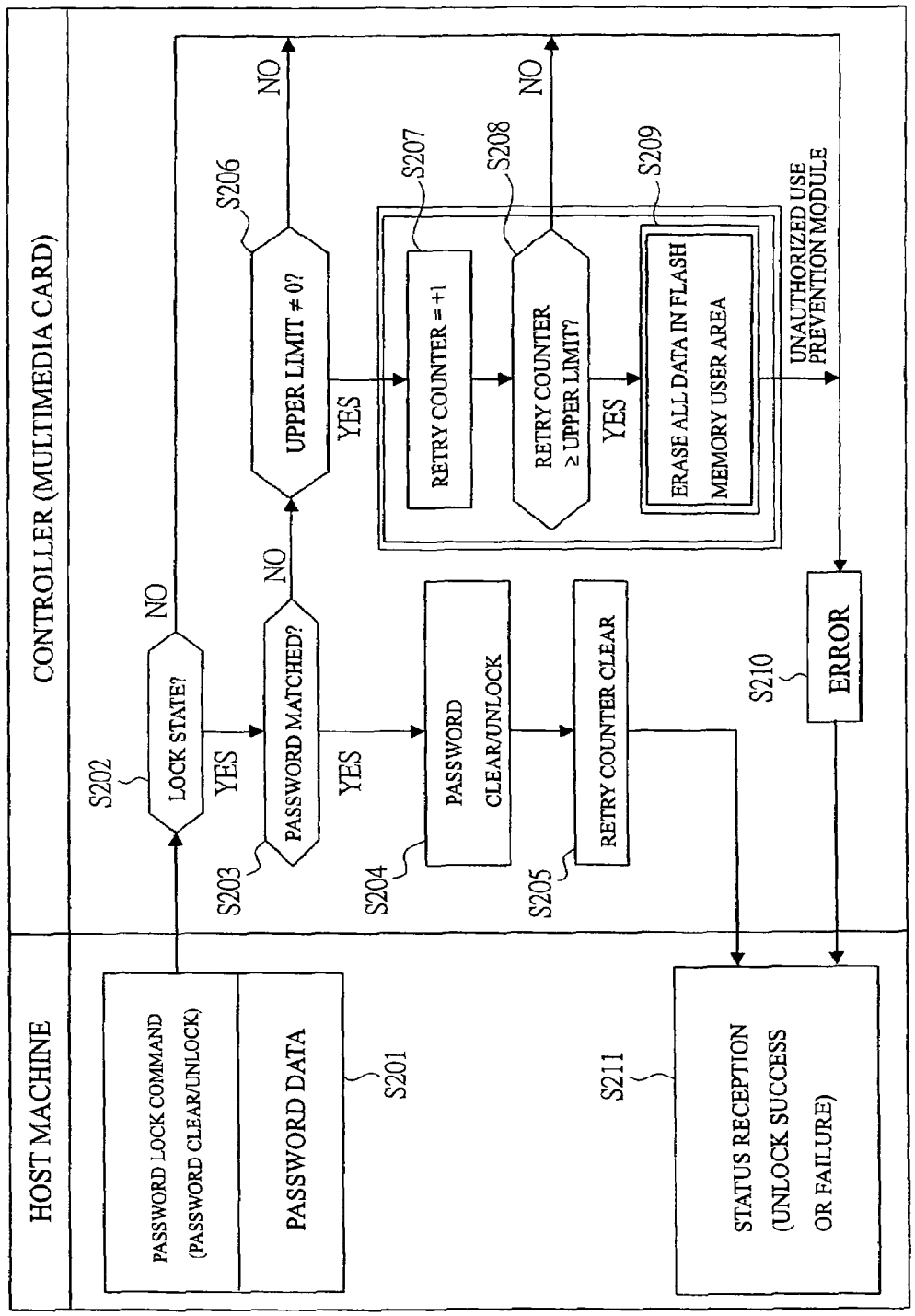
FIG. 5 is a flow diagram showing the operation in the case where a password lock command (password clear/unlock) is issued according to an embodiment of the present invention.
Figure 6:
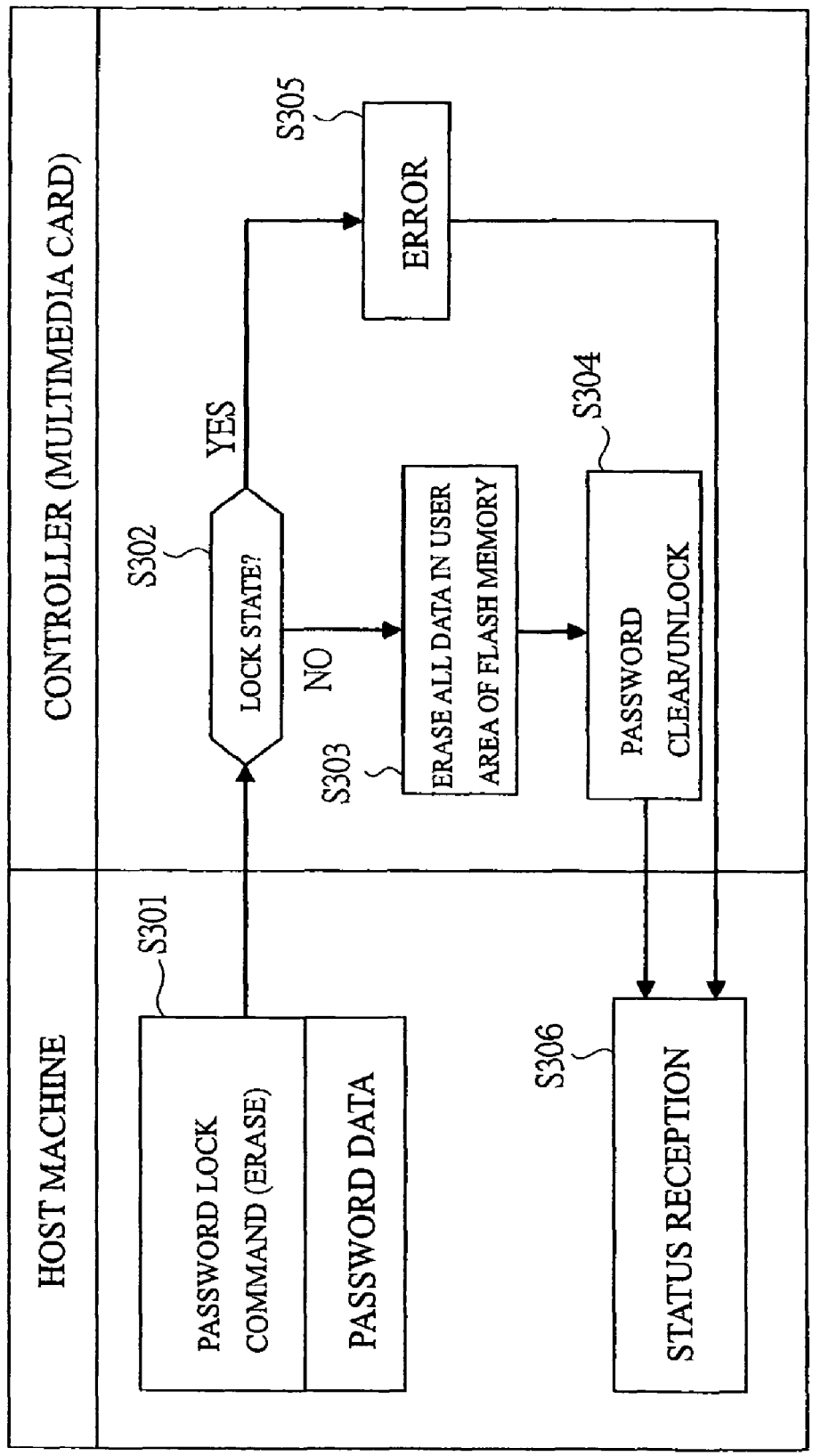
FIG. 6 is a flow diagram showing the operation in the case where a password lock command (erase) is issued according to an embodiment of the present invention.

First, an example of the password authentication in the case where the password lock command is issued will be described with reference to FIGS. 2 to 6. FIG. 2 is an explanatory diagram showing the password authentication in the case where a password lock command is issued, FIG. 3 is an explanatory diagram showing the bit allocation of the password block in the secure area, and FIGS. 4 to 6 are flow diagrams showing each of the operations in the case where the password lock commands (password set/lock, password clear/unlock, and erase) are issued.

When passwords are repeatedly entered while issuing the password lock command, there is the possibility that the password may be discovered. Therefore, the data (user accessible area 21) on the flash memory 11 is all erased depending on the number of password failures to prevent the leakage of the data.

Therefore, as shown in FIG. 2, a retry counter (counting means) 51 as a register to store the number of password authentication failures is provided, and an upper limit 52 of the number of failures is set in a register (storage means). The retry counter 51 and the upper limit 52 are allocated and provided in the password blocks in the secure area 22 of the flash memory 11 described later with reference to FIG. 3.

In the configuration having the above-mentioned retry counter 51 and the upper limit 52, when passwords are repeatedly entered once, twice, . . . and n times, the value of the retry counter 51 is incremented and compared with the upper limit 52 of the number of failures. Then, when the value of retry counter 51 reaches the upper limit 52, the data is automatically erased so as to completely remove the data from the flash memory 11. Also, when the password authentication is successful, the retry counter 51 is returned to 0. Note that the upper limit 52 of the number of failures can be optionally set, and if the upper limit is set to 0, the upper limit becomes infinitely large.

As shown in FIG. 3, in the password block in the secure area 22 on the flash memory 11, the password set (SET_PWD) is allocated to the Bit 0 of the Byte 0, the password clear (CLR_PWD) is allocated to the Bit 1 of the Byte 0, the lock_unlock (LOCK_UNLOCK) is allocated to the Bit 2 of the Byte 0, and the erase (ERASE) is allocated to the Bit 3 of the Byte 0, respectively.

For example, the password lock command (password set/lock) is set as Bit 0=1/Bit 2=1, the password lock command (password clear/unlock) is set as Bit 1=1/Bit 2=0, and the password lock command (erase) is set as Bit 3=1.

Furthermore, the password length (PWD_LEN) is allocated to the Byte 1 and the password data is allocated to the Byte 2 to Byte PWD_LEN+1, respectively.

Also, in the password block in the secure area 22, the above-mentioned retry counter 51 to store the number of password authentication failures is allocated to the Byte N-3 and N-2 and the upper limit 52 of the number of failures is allocated to the Byte N-1 and N, respectively.

As shown in FIG. 4, when the password lock command (password set/lock) is issued and the password data is transmitted from the host machine 2 to the multimedia card 1 (Step S101), the controller 12 of the multimedia card 1 determines whether or not a password is set by the command from the host machine 2 (Step S102). When a password is set (YES), it is determined that whether or not a password is set in advance (Step S103). When a password is set in advance, a password for authentication (not shown) is issued from the host machine 2, and it is determined whether or not the authentication password matches the password set in advance (Step S106). If the password set in advance matches the issued authentication password (YES in Step S106) or a password is not set in advance (NO in Step S103), the setting of the password is done based on the password data transmitted together with the command from the host machine (Step S105).

When the password is not set by the command (NO in Step S102), it is determined whether or not the multimedia card 1 is in a locked state (Step S104).

When the multimedia card 1 is not in a locked state (NO) in the determination in Step S104, it is determined whether or not the authentication password matches the password set in advance (Step S107). If the authentication password matches the password set in advance (YES), the process for the password lock is done (Step S109), the retry counter is cleared (Step S110), and the status data indicating that the multimedia card 1 is set to a password lock state is transmitted to the host machine 2.

If the authentication password does not match the password set in advance (No in Step S106 and NO in Step S107), it is determined whether or not the upper limit 52 of the number of failures is not set to 0 (Step S108). When it is set to 0 (NO), the error is transmitted to the host machine 2 (Step S114).

When the upper limit 52 of the number of failures is set to the value other than 0 (YES in Step S108), the retry counter 51 is incremented by 1 (Step S111) and it is determined whether or not the value of the retry counter 51 exceeds the upper limit 52 of the number of failures (Step S112). When the value of the retry counter 51 does not exceed the upper limit 52 (NO), the error is transmitted to the host machine 2 (Step S114). On the other hand, the value of the retry counter 51 exceeds the upper limit 52 (YES in Step S112), the data stored in the user accessible area 21 of the flash memory 11 is all erased (Step S113).

Then, the host machine 2 receives the status data of the password clear/lock state (lock setting is successful) after the clear of the retry counter 51 in Step S110 and the status data of the error (lock setting is not successful) in Step S114 (Step S115).

The process in Steps S111 to S113 is performed in the unauthorized use prevention module.

As shown in FIG. 5, when the password lock command (password clear/unlock) is issued and the password data is transmitted (Step S201) from the host machine 2 to the multimedia card 1, the controller 12 of the multimedia card 1 determines whether or not the multimedia card 1 is in a locked state (Step S202).

When the multimedia card 1 is in a locked state (YES) in the determination in Step S202, it is determined whether or not the password matches (Step S203). If the password matches (YES), the process for the password lock clear/unlock is done (Step S204), the retry counter 51 is cleared (Step S205), and the status data indicating that the multimedia card 1 is set to a password clear/unlock state is transmitted to the host machine 2.

Also, if the password does not match (No) in the determination in Step S203, it is determined whether or not the upper limit 52 is not set to 0 (Step S206). When it is not set to 0 (YES), the retry counter is incremented by 1 (Step S207), and then, it is determined whether or not the retry counter 51 is larger than the upper limit 52 (Step S208). When the retry counter 51 is larger than the upper limit 52 (YES), the data in the user accessible area 21 of the flash memory 11 is all erased (Step S209).

Furthermore, after the data in the user accessible area 21 of the flash memory 11 is all erased, when the multimedia card 1 is not in a locked state in Step S202 (NO), when the upper limit 52 is 0 in Step 206 (NO), and when the retry counter 51 is not larger than the upper limit 52 in Step S208 (NO), the error is transmitted to the host machine 2 (Step S210).

Then, the host machine 2 receives the status data of the password clear/unlock state (unlock setting is successful) after the clear of the retry counter 51 in Step S205 and the status data of the error (unlock setting is not successful) in Step S210 (Step S211).

The process in Steps S207 to S209 is performed in the unauthorized use prevention module.

As shown in FIG. 6, when the password lock command (erase) is issued from the host machine 2 to the multimedia card 1 and the password data is transmitted (Step S301), the controller 12 of the multimedia card 1 determines whether or not the multimedia card 1 is in a locked state (Step S302).

When the multimedia card 1 is not in a locked state (NO) in the determination in Step S302, all data in the data area (user accessible area 21) of the flash memory 11 is erased (Step S303) and the process for the password clear/unlock is done (Step S304), and thereafter, the status data indicating that the multimedia card 1 is in a password clear/unlock state is transmitted to the host machine 2. Also, when the multimedia card 1 is in a locked state (YES), the error (Step S305) is transmitted to the host machine 2. Then, the host machine 2 receives the each of the status data (Step S306).

Figure 7:
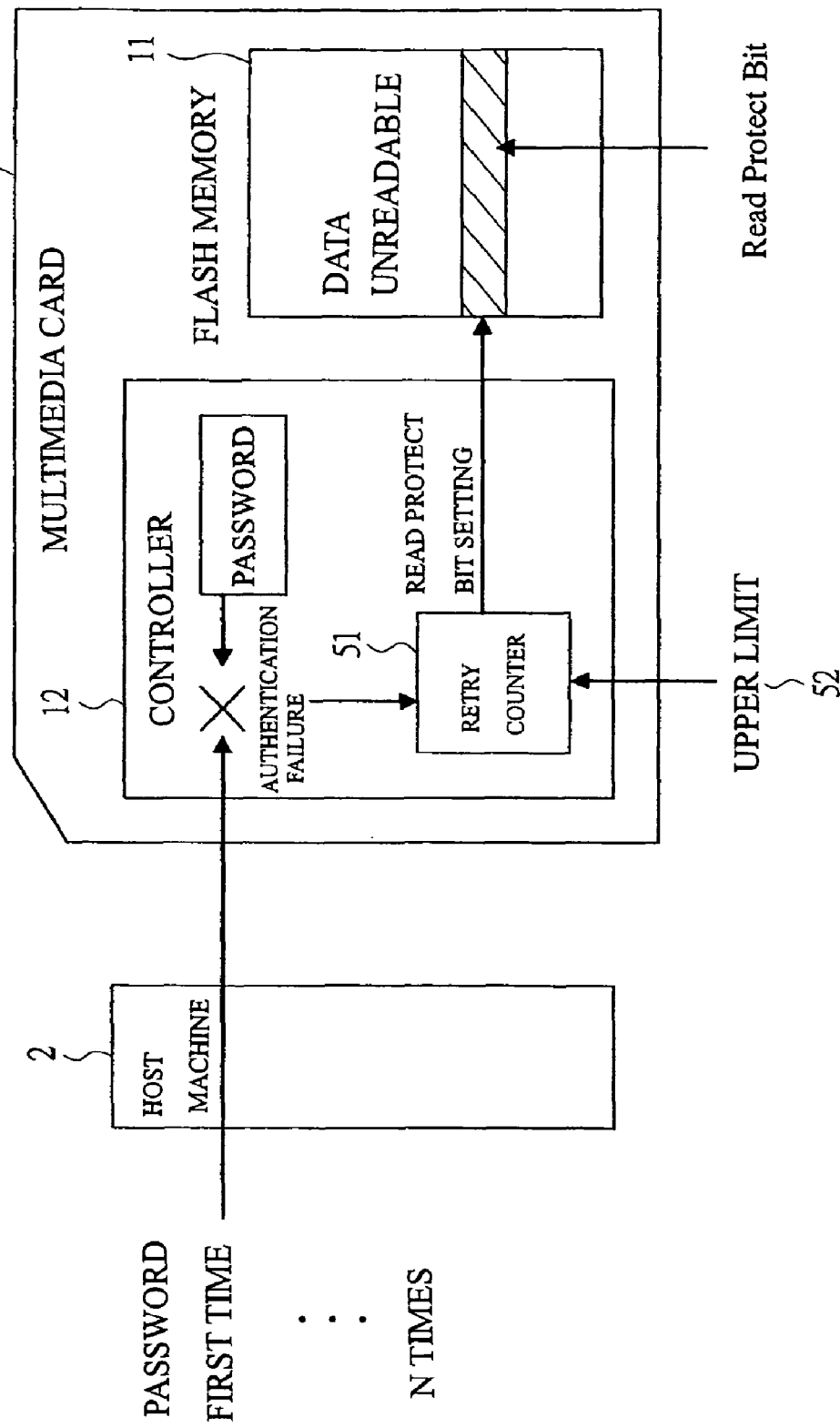
FIG. 7 is an explanatory diagram showing the setting of the read protect bit in the case where a password lock command is issued according to an embodiment of the present invention.
Figure 8:
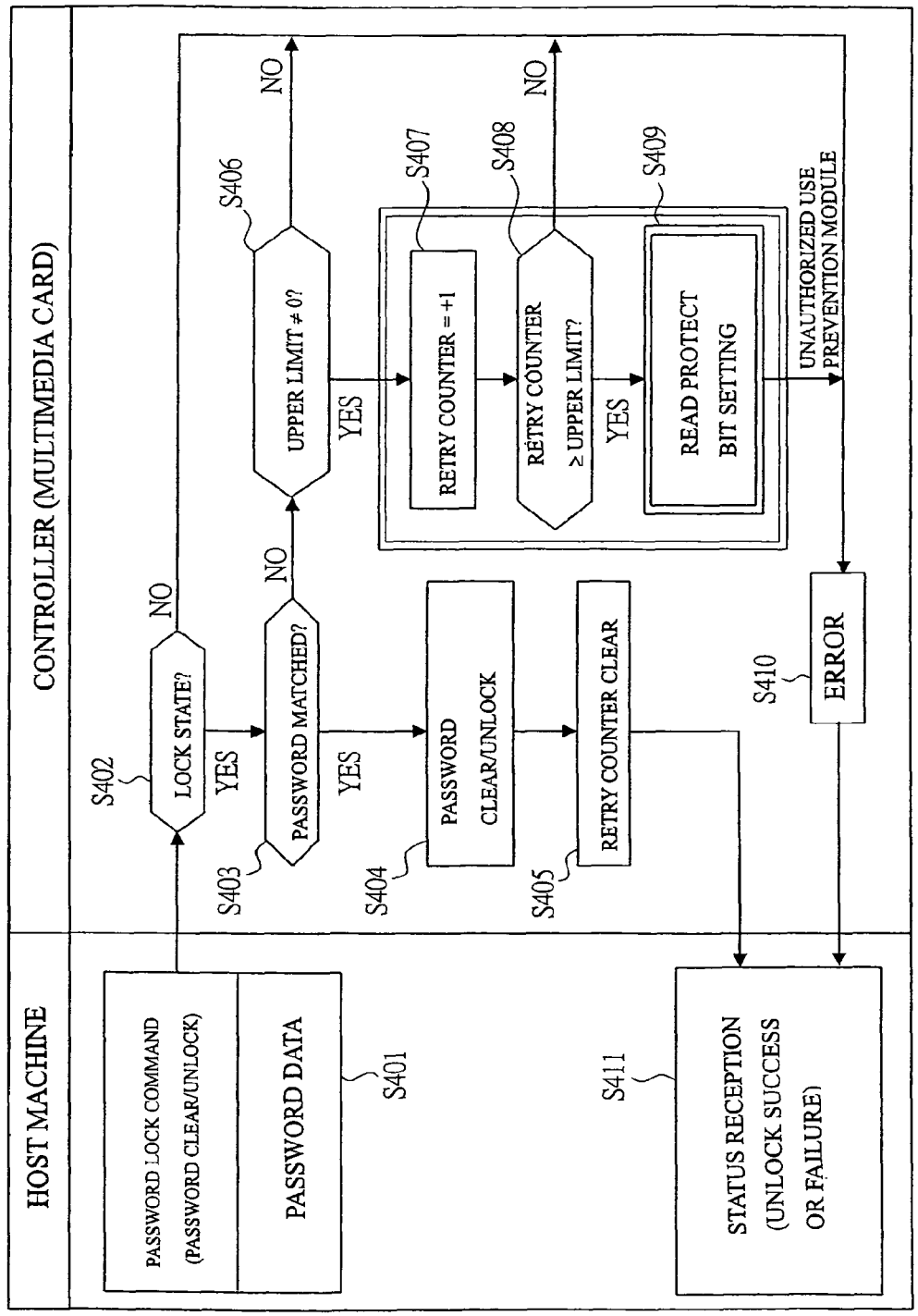
FIG. 8 is a flow diagram showing the setting of the read protect bit at a time of the password failure according to an embodiment of the present invention.
Figure 9:
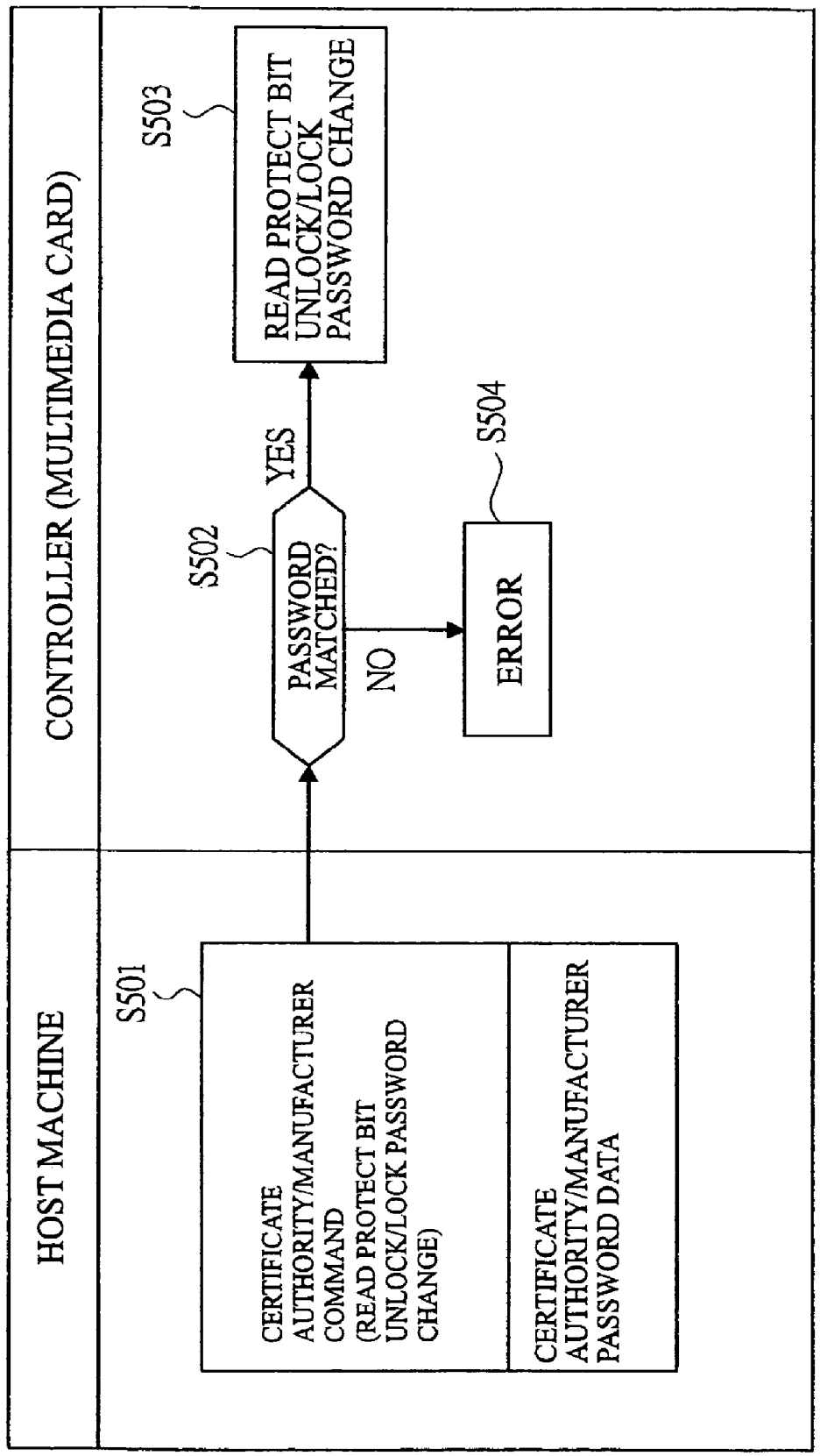
FIG. 9 is a flow diagram showing the operation of the setting clear of the read protect bit (program stored) according to an embodiment of the present invention.
Figure 10:
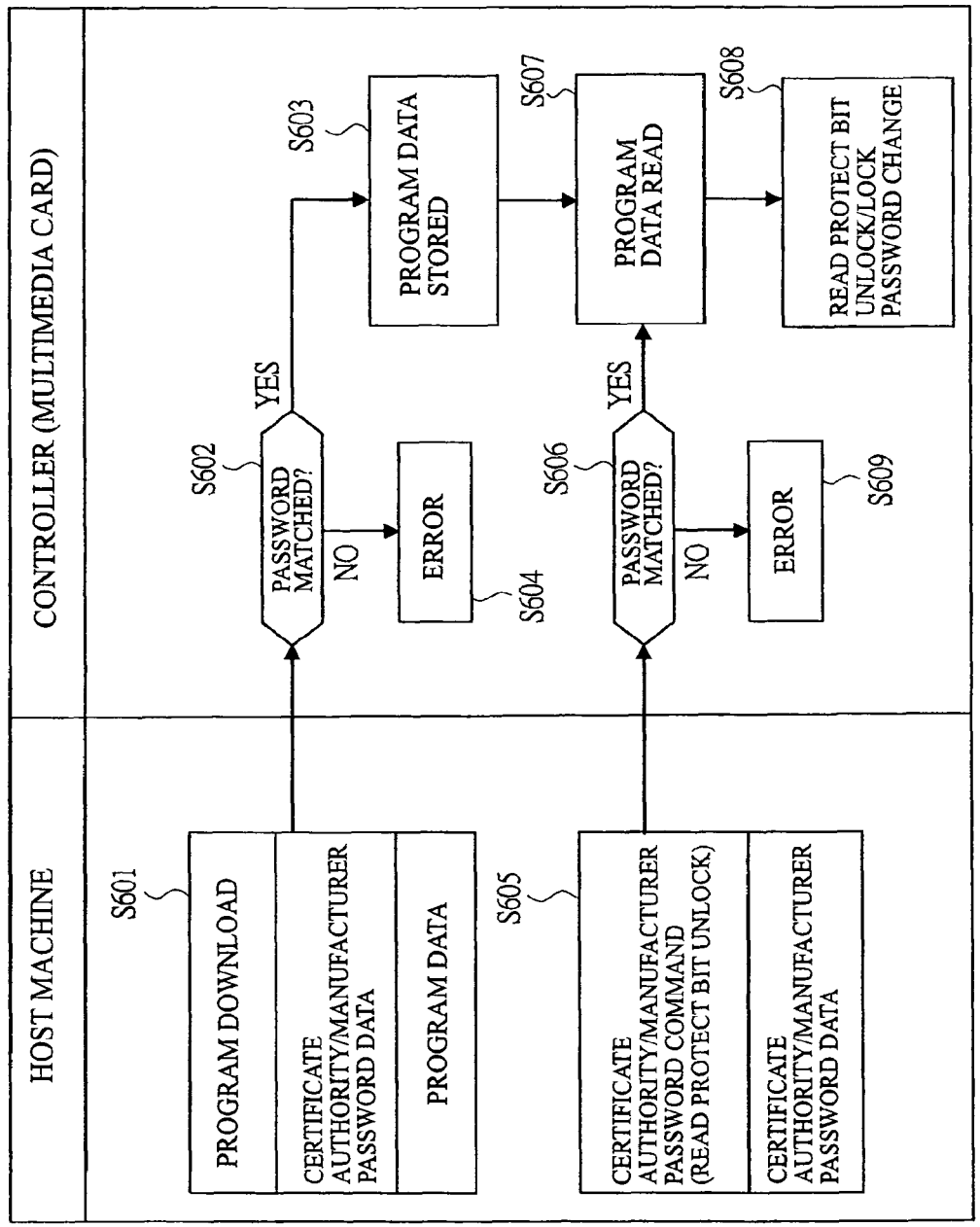
FIG. 10 is a flow diagram showing the operation of the setting clear of the read protect bit (program not stored) according to an embodiment of the present invention.
Figure 11:
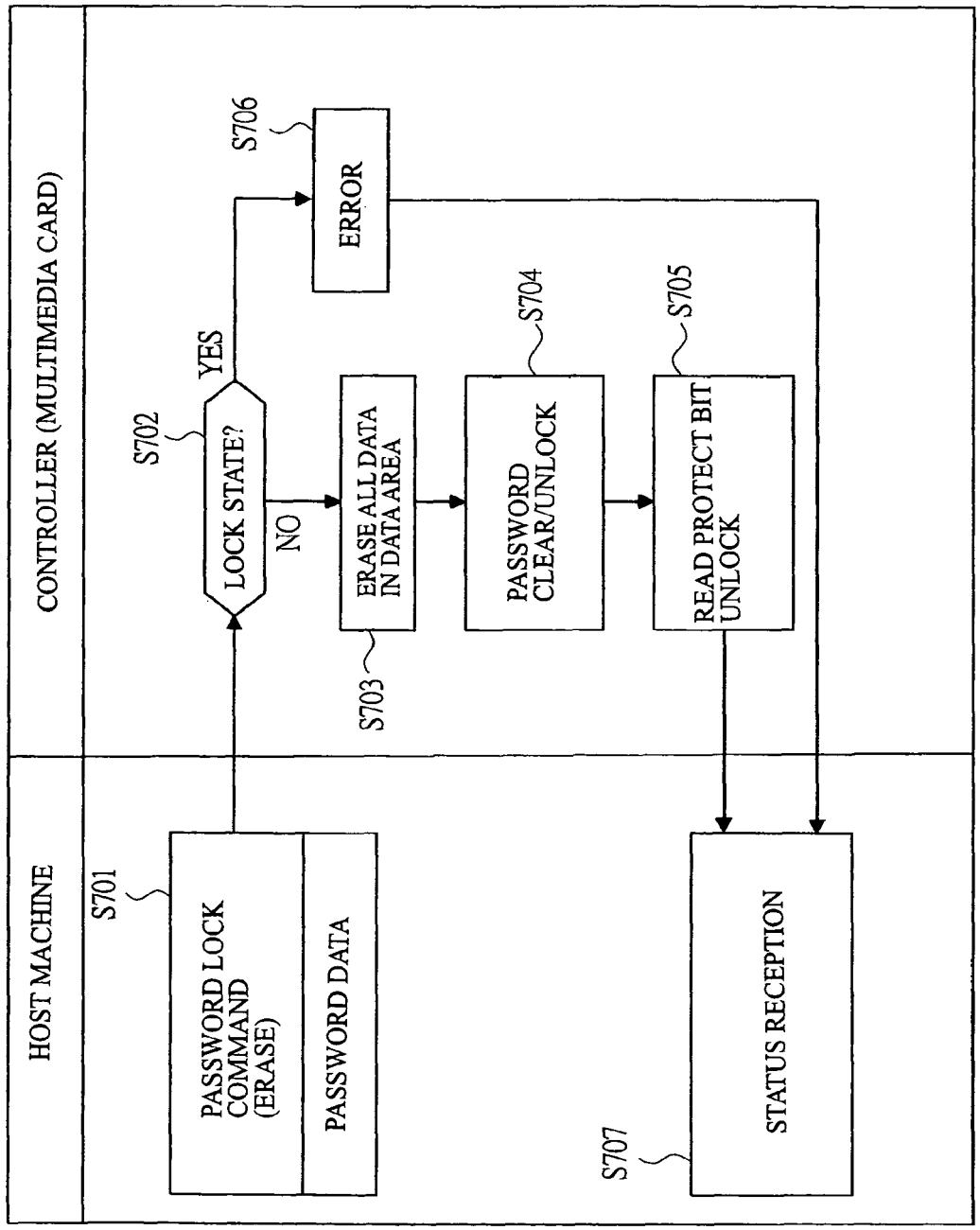
FIG. 11 is a flow diagram showing the operation of the setting clear of the read protect bit (erase) according to an embodiment of the present invention.

Next, an example of the setting of the read protect bit in the case where the password lock command is issued will be described with reference to FIGS. 7 to 11. FIG. 7 is an explanatory diagram showing the setting of the read protect bit in the case where a password lock command is issued, FIG. 8 is a flow diagram showing the setting of the read protect bit at the time of the password failure, and FIGS. 9 to 11 are flow diagrams showing the operations of the setting clear of the read protect bit (program stored, program not stored, and erase).

As shown in FIG. 7, when the retry counter 51 reaches the upper limit 52 while issuing the password lock command, the read protect bit is set in the secure area 22 of the flash memory 11 so as to make the data unreadable even if the password authentication is successful thereafter. More preferably, it is desired to set also the write protect bit so as to make the data unwritable.

When compared with the above-mentioned data erase method described with reference to FIGS. 2 to 6, since the data is merely made unavailable, the data is not completely removed from the memory. In addition, the time for erasing the data is unnecessary. However, the method in which the data is erased is superior in security. Also, this method can be applied not only to the entire area of the flash but also to a part of the flash. In the present invention, it is also possible to apply the method in which the data is made unreadable/unwritable to a part of the flash that uses the method in which the data is erased. In this case, it is possible to select the methods for each data depending on the security level and the contents of the data (for example, erasable data, inerasable data).

Since the data is not erased in this method in which the data is made unreadable, the data can be returned to be readable in the following manner. (1) The read protect bit is erased by using the certificate authority/manufacturer command. Note that the certificate authority/manufacturer command is a command which cannot be used by the general users, and if the system administrator (certificate authority) is designated on the customer side, the certificate authority/manufacturer command becomes available by using the certificate authority password. In this method, it is also possible to change the password. (2) When the automatic erase of the data is performed, the read protect bit is also erased.

As shown in FIG. 8, when the password lock command (password clear/unlock) is issued and the password data is transmitted from the host machine 2 to the multimedia card 1 (Step S401), similar to the case shown in FIG. 5, the determination of the lock state (Step S402), the determination of the password matching (Step S403), the process of the password clear/unlock (Step S404), the clear of the retry counter (Step S405), the determination whether the upper limit ≠0 (Step S406), the increment of the retry counter by 1 (Step S407), and the determination whether the retry counter ≧upper limit (Step S408) are performed in the controller 12 of the multimedia card 1. Thereafter, when the retry counter 51 is larger than the upper limit 52 (YES), the read protect bit is set in the secure area 22 of the flash memory 11 (Step S409).

Then, after setting the read protect bit in the secure area 22 of the flash memory 11, similar to the case shown in FIG. 5, the error is transmitted to the host machine 2 (Step S410). Then, the host machine 2 receives the status data of the password clear/unlock state (unlock is successful) after the clear of the retry counter 51 in Step S405 and the status data of the error (unlock is not successful) in Step S410 (Step S411).

The process in Steps S407 to S409 is performed in the unauthorized use prevention module.

As shown in FIG. 9, when the certificate authority/manufacturer command (read protect bit unlock/lock password change) is issued and the certificate authority/manufacturer password data is transmitted from the host machine 2 to the multimedia card 1 (Step S501), the controller 12 of the multimedia card 1 determines whether or not the password matches (Step S502).

If the password matches (YES) in the determination in Step S502, the process of the read protect bit unlock/lock password change is performed (Step S503). Also, if the password does not match (NO), the error is transmitted (Step S504). In this state, since the read protect bit is unlocked, that is, it is in an enable state, the data becomes readable and the data write and the data erase can also be performed.

The example in FIG. 9 shows the procedure in the case where the password authentication program 43 is stored in the multimedia card 1 in advance. If the password authentication program 43 is not stored in the multimedia card 1, the procedure is as shown in FIG. 10 described later.

As shown in FIG. 10, in the case where the password authentication program 43 is not stored in the multimedia card 1, the program is first downloaded and the certificate authority/manufacturer password data and the program data are transmitted from the host machine 2 to the multimedia card 1 (Step S601). Then, the controller 12 of the multimedia card 1 determines whether or not the password matches (Step S602). If the password matches (YES), the process for storing the program data is performed (Step S603), and if the password does not match (NO), the error is transmitted (Step S604).

Thereafter, similar to the case shown in FIG. 9, the certificate authority/manufacturer command (read protect bit unlock) is issued and the certificate authority/manufacturer password data is transmitted from the host machine 2 to the multimedia card 1 (Step S605) and the determination of the password matching is performed (Step S606). Then, if the password matches (YES), the program data stored in Step S603 is read (Step S607) and the process for the read protect bit unlock/lock password change is performed (Step S608). Also, if the password does not match (NO), the error is transmitted (Step S609).

As shown in FIG. 11, in the case of automatically erasing all data in the data area (user accessible area 21) of the flash memory 11, similar to the case shown in FIG. 6, the password lock command (erase) is issued and the password data is transmitted from the host machine 2 to the multimedia card 1 (Step S701), and then, the determination of the lock state (Step S702), the erase of all data in the data area (Step S703), and the process for the password clear/unlock (Step S704) are performed. Thereafter, the process for the read protect bit unlock is performed (Step S705).

Then, the host machine 2 receives the status data indicating the password clear/unlock state and the read protect unlock state (Step S707). Alternatively, in the case of the lock state (YES) in Step S702 (Step S707), the host machine 2 receives the status data of the error (Step S706).

Figure 12:
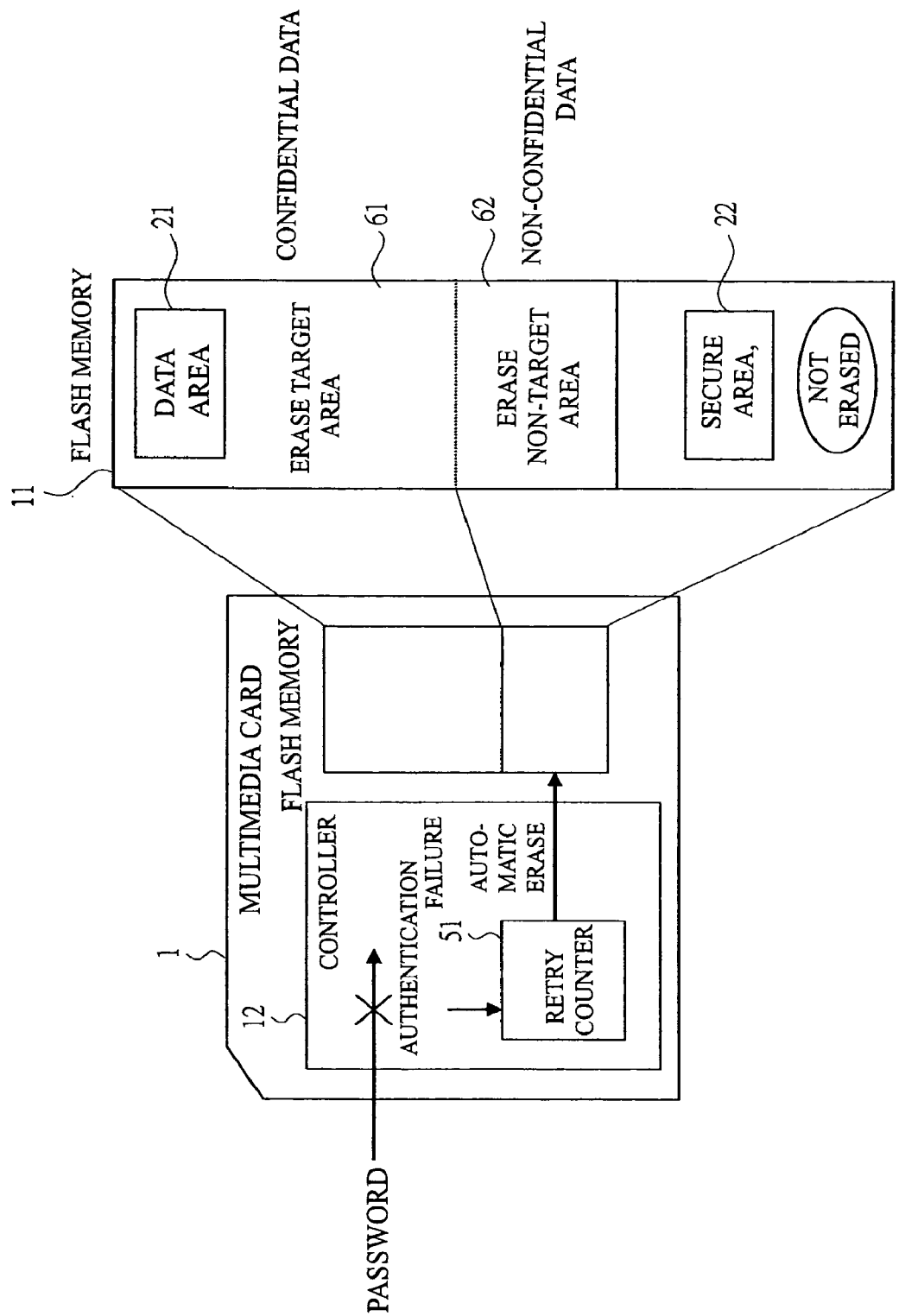
FIG. 12 is an explanatory diagram showing the setting of the data erase area in the case where a password lock command is issued according to an embodiment of the present invention.

Next, an example of the setting of the data erase area in the case where the password lock command is issued will be described with reference to FIGS. 12 to 14. FIG. 12 is an explanatory diagram showing the setting of the data erase area in the case where the password lock command is issued, and FIGS. 13 and 14 are explanatory diagrams showing the setting range of the data erase area (address registration, control area identification code).

As shown in FIG. 12, it is possible to specify the area of the flash memory 11, the data of which is erased (data read disable) when the password authentication fails. More specifically, of the data area (user accessible area 21), only the erase target area 61 in which the confidential data is stored is erased, and the erase non-target area 62 in which the non-confidential data is stored is not erased. The data erase when the password authentication fails is done only in the data area, and the data in the secure area 22 is not erased so that the normal operation and the resetting of the password after the data erase can be performed.

Figure 13:
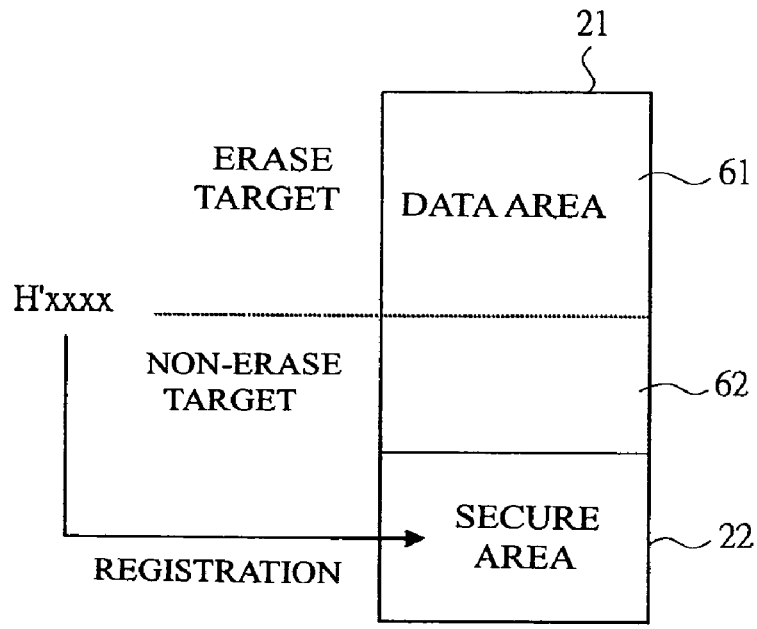
FIG. 13 is an explanatory diagram showing the setting range of a data erase area (address registration) according to an embodiment of the present invention.

As shown in FIG. 13, in the case where the address of the erase target area is registered, the data area is sorted into the erase target area 61 and the erase non-target area 62, and the last part of the address of the erase target area 61 (H'xxx) is registered to the secure area 22. By doing so, the area until the address (H'xxx) registered in the secure area 22 is defined as the erase target area 61 and the data in this area is erased.

Figure 14:
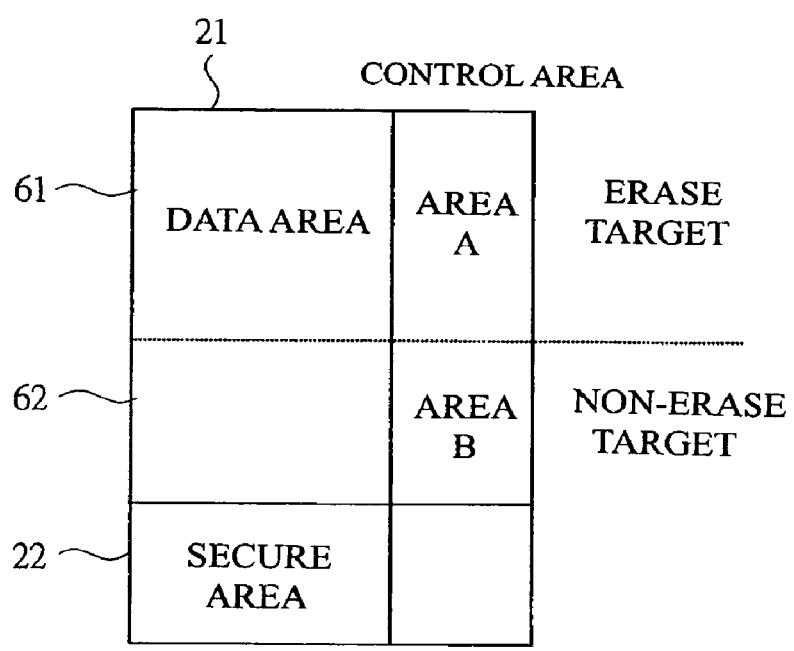
FIG. 14 is an explanatory diagram showing the setting range of a data erase area (control area identification code) according to an embodiment of the present invention.

As shown in FIG. 14, in the case where the erase target area is determined by using the identification code of the control area, the data area is sorted by the identification codes of the control area. More specifically, the area A is defined as the erase target area 61 and the area B is defined as the erase non-target area 62. Therefore, the area A sorted by the identification code of the control area is defined as the erase target area 61 and the data in this area A is to be erased.

Figure 15:
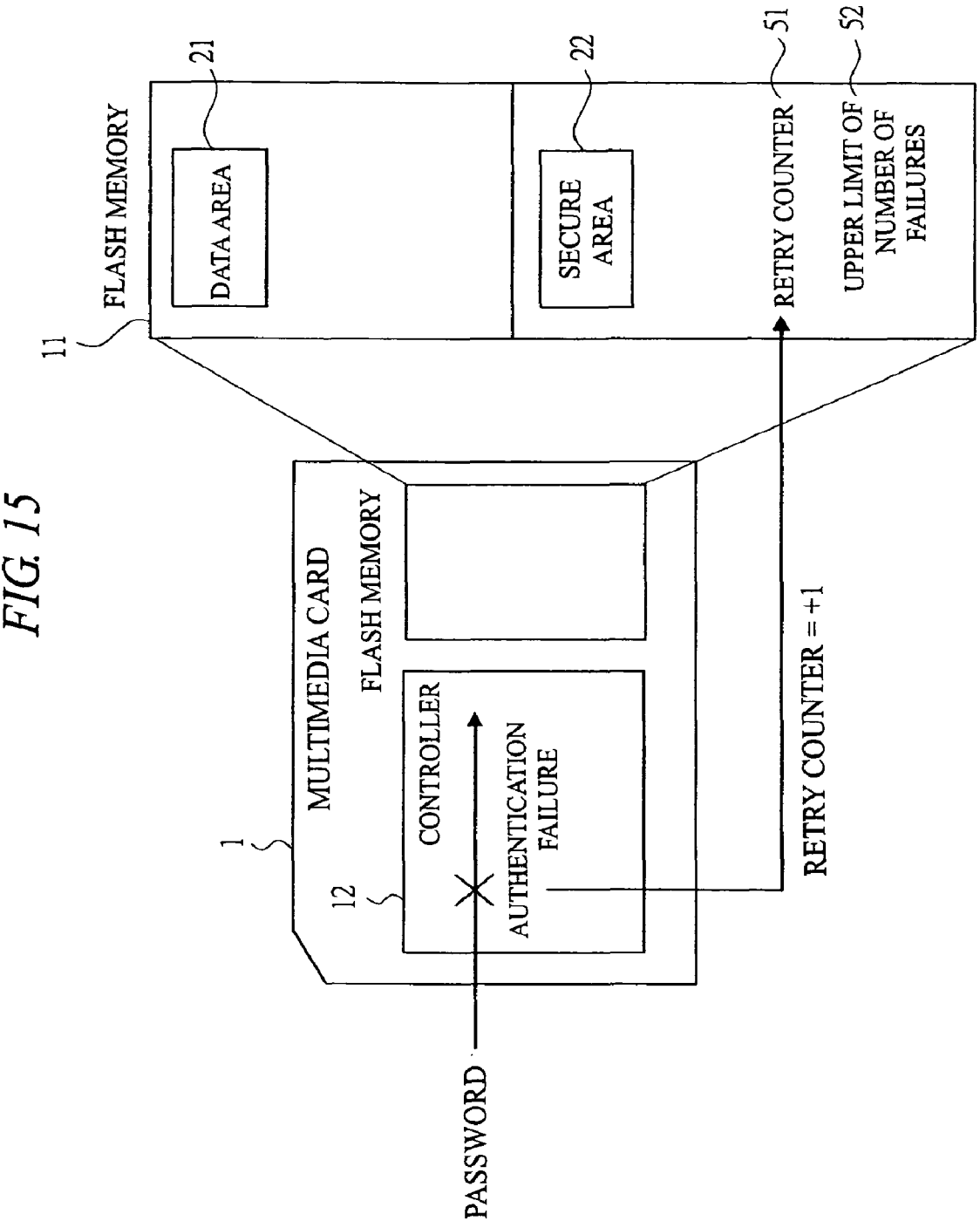
FIG. 15 is an explanatory diagram showing the writing of the retry counter to a flash memory in the case where a password lock command is issued according to an embodiment of the present invention.
Figure 16:
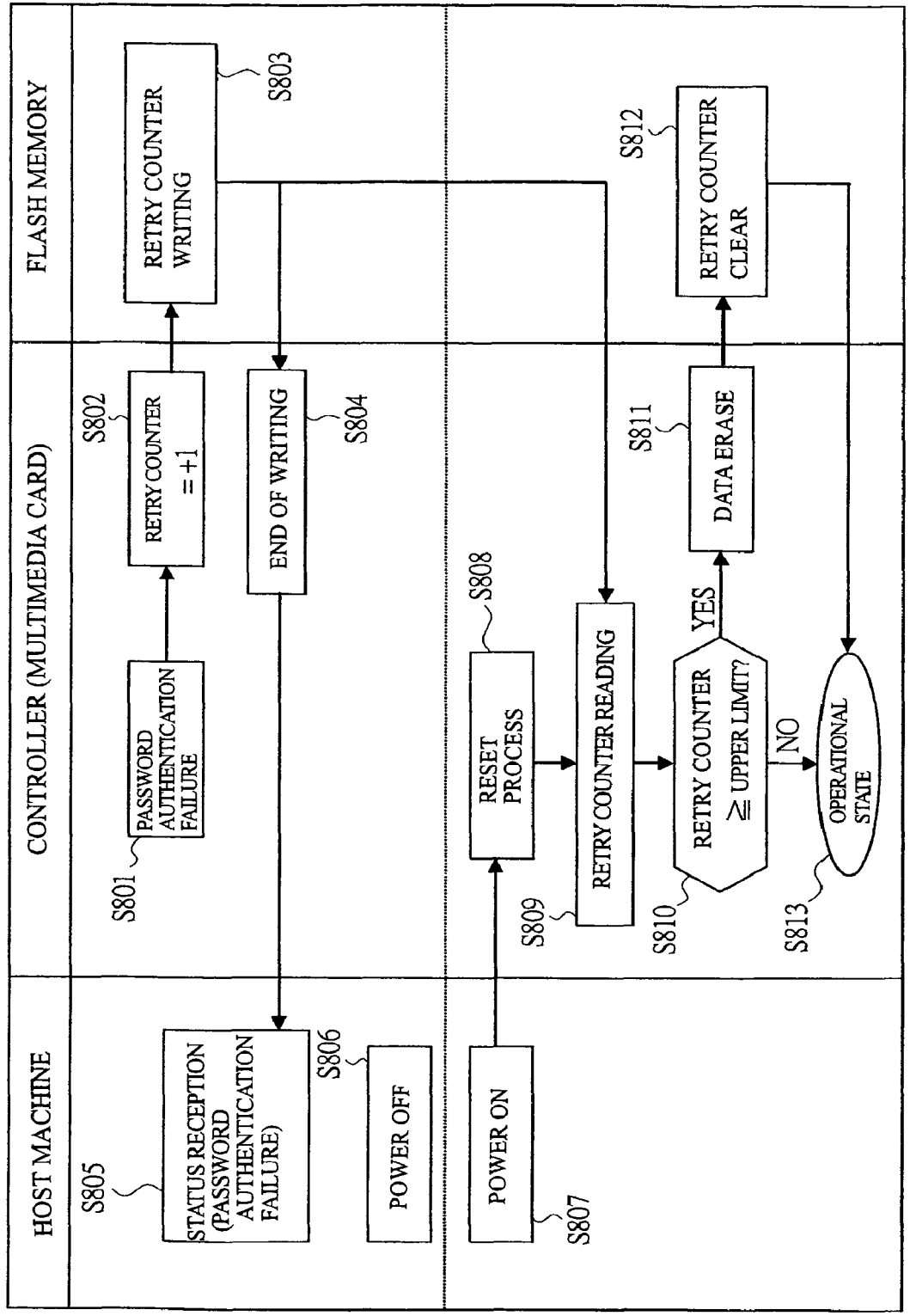
FIG. 16 is a flow diagram showing the data erase in the reset process according to an embodiment of the present invention.

Next, an example of the writing of the retry counter to the flash memory when the password lock command is issued will be described with reference to FIGS. 15 and 16. FIG. 15 is an explanatory diagram showing the writing of the retry counter to a flash memory in the case where a password lock command is issued, and FIG. 16 is a flow diagram showing the data erase in the reset process.

As shown in FIG. 15, the retry counter 51 for counting the password authentication failures is stored in the secure area 22 of the flash memory 11 so as not to be lost even when the power supply is turned off, and the upper limit 52 of the authentication failures is also written in the secure area 22 of the flash memory 11. By doing so, even if the power supply is turned off thereafter, it is possible to return to the state before the power off by reading the retry counter 51 and the upper limit 52 from the flash memory 11 when the power supply is turned on again.

Therefore, even if a user intentionally turns off the power to prevent the data erase at the moment when the number of failures of password authentication exceeds the upper limit 52 and all data in the data area (user accessible area 21) is automatically erased, all data in the data area is erased when the power supply is turned on again.

In the writing of the retry counter 51 or the upper limit 52 to the flash memory 11, the so-called additional write function is preferably used. The additional write function is described in detail in Japanese Patent Application Laid-Open No. 10-079197 and No. 11-345494. The writing to the flash memory 11 is usually done in units of sectors of, for example, 512 bytes. However, the additional write function makes it possible to write to a part of the sector and the time required for the writing of the retry counter 51 or the upper limit 52 to the flash memory 11 can be reduced.

As shown in FIG. 16, in the case where the data is erased in the reset process, when the controller 12 of the multimedia card 1 confirms the password authentication failure (Step S801), the retry counter 51 is incremented by 1 (Step S802), and the retry counter 51 is written to the secure area 22 of the flash memory 11 (Step S803). Thereafter, the end of the writing is transmitted to the host machine 2 (Step S804). Then, the host machine 2 receives the status data of the end of the writing (password authentication failure) (Step S805). Although not shown in FIG. 4 and other drawings, the writing of the retry counter 51 to the secure area 22 of the flash memory 11 is preferably done after incrementing the retry counter 51 by 1 in Step S111 in FIG. 4.

When the power supply of the host machine 2 is turned off (OFF) (Step S806) and then turned on again (ON) (Step S807), the controller 12 of the multimedia card 1 performs the reset process (Step S808). Then, the controller 12 reads out the retry counter 51 written to the secure area 22 of the flash memory 11 in Step S803 (Step S809) and determines whether or not the retry counter 51 is larger than the upper limit 52 (Step S810).

In the case where the retry counter 51 is larger than the upper limit 52 as a result of this determination (YES), the data in the data area of the flash memory 11 is erased (Step S811) and the retry counter 51 in the secure area 22 of the flash memory 11 is cleared (Step S812).

After the retry counter 51 is cleared or when the retry counter 51 is not larger than the upper limit 52 in the determination in Step S810 (NO), the controller 12 of the multimedia card 1 sets the multimedia card 1 in a normal operational state (Step S813).

Figure 17:
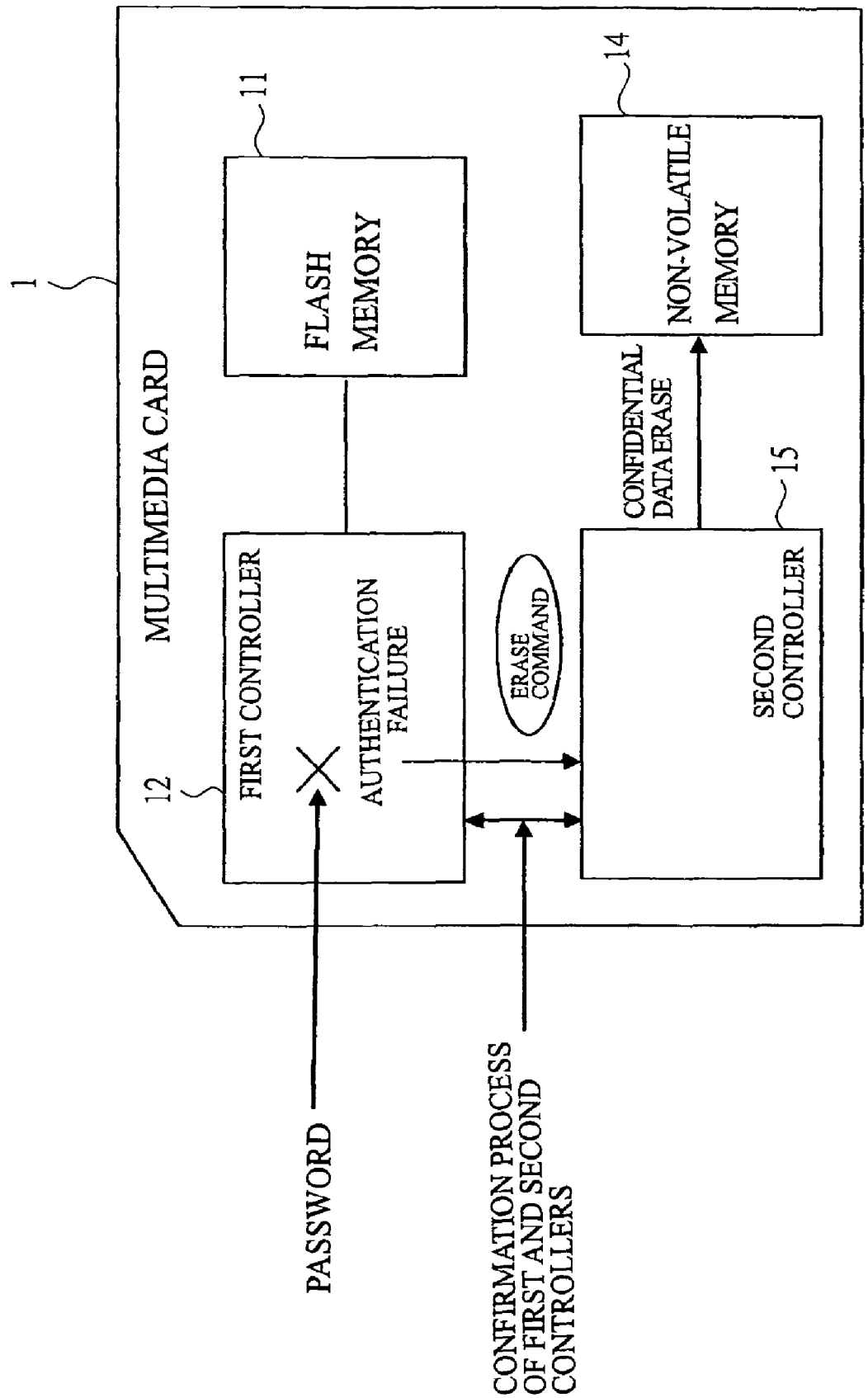
FIG. 17 is an explanatory diagram showing the erase of the confidential data by another controller in the case where a password lock command is issued according to an embodiment of the present invention.

Next, an example of erasing the confidential data by another controller in the case where the password lock command is issued will be described with reference to FIGS. 17 and 18. FIG. 17 is an explanatory diagram showing the erase of the confidential data by another controller in the case where a password lock command is issued, and FIG. 18 is a flow diagram showing the transmission of the erase command to another controller.

As shown in FIG. 17, a second controller 15 for controlling the access to the non-volatile memory 14 is provided in the multimedia card 1 in addition to the first controller 12 for controlling the access to the flash memory 11. In this configuration, when the password authentication fails, the erase command is issued to the non-volatile memory 14 controlled by the second controller 15 to erase the confidential data in the non-volatile memory 14.

Figure 18:
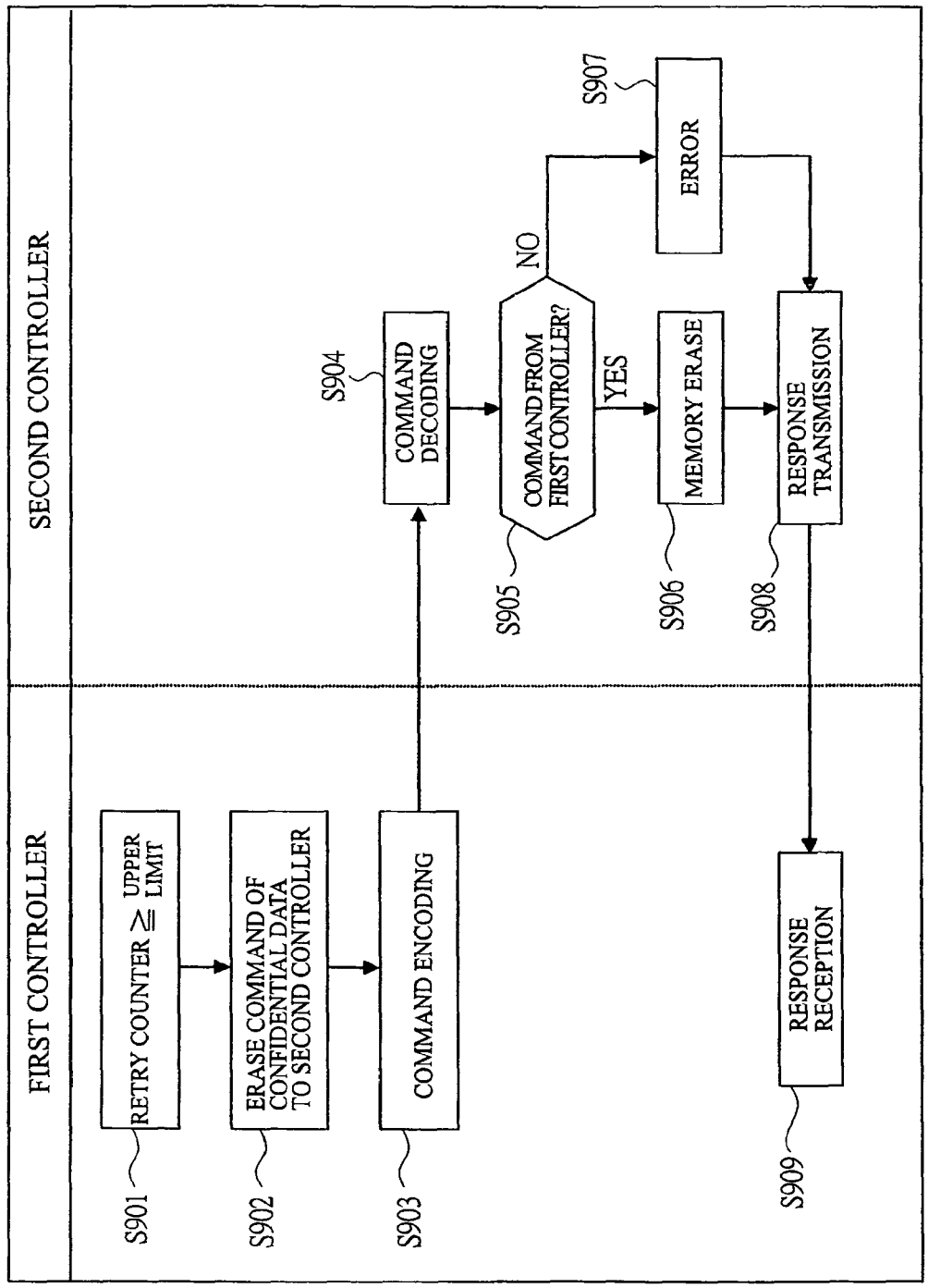
FIG. 18 is a flow diagram showing the transmission of an erase command to another controller according to an embodiment of the present invention.

As shown in FIG. 18, when the password authentication fails in the first controller 12 and the retry counter 51 reaches the upper limit 52 (Step S901), the erase command of the confidential data in the non-volatile memory 14 is issued from the first controller 12 to the second controller 15 (Step S902). At this time, this erase command is encoded when it is transmitted (Step S903).

Then, the second controller 15 receives and decodes the encoded command (Step S904) and determines whether or not the received command is the command from the first controller 12 (Step S905). Only when the received command is the command from the first controller 12 in this determination (YES), the confidential data in the non-volatile memory 14 is erased in accordance with the erase command (Step S906).

Furthermore, after erasing the confidential data in the non-volatile memory 14, the response is transmitted from the second controller 15 to the first controller 12 (Step S908) or when the received command is not the command from the first controller 12 in the determination in Step S905 (NO), the response as the error (Step S907) is transmitted from the second controller 15 to the first controller 12 (Step S908). Then, the first controller 12 receives each of the responses (Step S909).

As described above, according to this embodiment, since there is the limitation on the number of password authentications, the data is automatically erased regardless of the intention of the user when the incorrect passwords are repeatedly entered and the number of password authentication failures exceeds the upper limit. Therefore, the leakage of the data can be prevented. Also, the risk of discovering the password can be reduced.

In addition, from the viewpoint of the host machine 2, since the configuration of the host machine 2 is unchanged from that used to execute normal commands of the multimedia card 1, the normal host machine 2 compatible with a multimedia card can use the function of the present invention.

In the foregoing, the invention made by the inventors of the present invention has been concretely described based on the embodiments. However, it is needless to say that the present invention is not limited to the foregoing embodiments and various modifications and alterations can be made within the scope of the present invention.

The example in which the data only in the user accessible area is erased so as to be able to reuse the memory card afterward has been described in the foregoing embodiments. However, if the memory card is not reused afterward, the data in not only the user accessible area but also other area such as the secure area can be erased.

For example, the case of using the flash memory as a non-volatile memory has been described in the foregoing embodiments. However, it is also possible to apply the present invention to another non-volatile memory such as the EEPROM.

Also, as described above, the present invention is effectively applied to the multimedia card having the flash memory mounted thereon. However, the present invention can be widely applied to various semiconductor memory devices such as other memory card of different standard, the memory module mounting the flash memory and the non-volatile memory, and the memory device. More particularly, the present invention can be effectively applied to the semiconductor memory device having the non-volatile memory in which the security data is stored.

The effect obtained by the typical ones of the embodiments disclosed in this application will be briefly described as follows.

(1) The limitation is imposed on the number of password authentications and the data can be automatically erased against the password-guessing attack. Therefore, it is possible to prevent the leakage of the user security data to a third party not having the access authority.

(2) According to (1), it is possible to reduce the risk of discovering the password.

What is claimed is:

1. A memory card, comprising:
a first non-volatile memory area; a second non-volatile memory area which stores secure information; a first controller which controls access to said first non-volatile memory area; and a second controller which controls access to said second non-volatile memory area, wherein:
said first controller has a function to issue an erase command of data stored in said second non-volatile memory area to said second controller when a number of incorrect password entries exceeds a predetermined value,
said second controller has a function to receive the erase command from said first controller and perform the data erase in said second non-volatile memory area, and
said data erase is performed again after power supply is turned on when the power supply is turned off during said data erase.

2. The memory card according to claim 1,
wherein said number of incorrect password entries and said predetermined value are retained to be read out after power supply is turned on, the read out values are used to return to a state before said power off, and then, said data erase is performed again.

* * * * *